US011486991B2

(12) United States Patent
Zhang et al.

(10) Patent No.: US 11,486,991 B2
(45) Date of Patent: Nov. 1, 2022

(54) METHOD AND SYSTEM FOR DETERMINING HORIZONTAL DISTANCE BETWEEN TRANSMITTING POINT AND RECEIVING POINT

(71) Applicant: National Deep Sea Center, Qingdao (CN)

(72) Inventors: Tongwei Zhang, Qingdao (CN); Lei Yang, Qingdao (CN); Shengjie Qin, Qingdao (CN); Xiangxin Wang, Qingdao (CN); Dequan Lu, Qingdao (CN); Jichao Yang, Qingdao (CN)

(73) Assignee: NATIONAL DEEP SEA CENTER, Qingdao (CN)

(*) Notice: Subject to any disclaimer, the term of this patent is extended or adjusted under 35 U.S.C. 154(b) by 594 days.

(21) Appl. No.: 16/568,740

(22) Filed: Sep. 12, 2019

(65) Prior Publication Data
US 2020/0209373 A1 Jul. 2, 2020

(30) Foreign Application Priority Data
Dec. 27, 2018 (CN) .......................... 201811609716.6

(51) Int. Cl.
*G01S 11/14* (2006.01)
*G01H 5/00* (2006.01)

(52) U.S. Cl.
CPC ................ *G01S 11/14* (2013.01); *G01H 5/00* (2013.01)

(58) Field of Classification Search
CPC .................................. G01S 11/14; G01H 5/00
See application file for complete search history.

(56) References Cited

U.S. PATENT DOCUMENTS

| 4,926,395 | A | * | 5/1990 | Boegeman | G01H 5/00 367/89 |
| 5,040,157 | A | * | 8/1991 | Roderick | G01S 11/14 367/3 |
| 2008/0165617 | A1 | * | 7/2008 | Abbot | G01S 11/14 367/3 |
| 2014/0108011 | A1 | * | 4/2014 | Nishino | G01S 3/8083 704/246 |

FOREIGN PATENT DOCUMENTS

JP H095435 A * 6/1995

* cited by examiner

*Primary Examiner* — Isam A Alsomiri
*Assistant Examiner* — Amie M Ndure
(74) *Attorney, Agent, or Firm* — Tutunjian & Bitetto, P.C.

(57) ABSTRACT

The present invention discloses a method and system for determining a horizontal distance between a transmitting point and a receiving point. The method obtains a depth value of the transmitting point and a depth value of the receiving point. An area of a sound velocity profile according to the depth value of the transmitting point and the depth value of the receiving point is then determined. A sound velocity gradient according to the area of the sound velocity profile is also determined. The horizontal distance between the transmitting point and the receiving point according to the sound velocity gradient is then determined by calculations. The present invention eliminates the need to calculate a grazing angle of an eigen sound ray(wave) connecting the transmitting point and the receiving point, by directly converting a propagation time into the horizontal distance, thereby quickly and efficiently calculating the horizontal distance between the transmitting point and the receiving point.

4 Claims, 2 Drawing Sheets

METHOD AND SYSTEM FOR DETERMINING HORIZONTAL DISTANCE BETWEEN TRANSMITTING POINT AND RECEIVING POINT

REFERENCE TO RELATED APPLICATIONS

This application claims priority to Chinese application number 201811609716.6, filed Dec. 27, 2018, with a title of METHOD AND SYSTEM FOR DETERMINING HORIZONTAL DISTANCE BETWEEN TRANSMITTING POINT AND RECEIVING POINT. The above-mentioned patent application is incorporated herein by reference in its entirety.

TECHNICAL FIELD

The present invention relates to the field of sound velocity propagation, and more particularly, to a method and system for determining a horizontal distance between a transmitting point and a receiving point.

BACKGROUND

In the ocean, the propagation velocity of a sound wave (sound velocity) is affected by seawater temperature, salinity and pressure (depth). Due to the uneven distribution of temperature and salinity in seawater, the sound velocity is distributed unevenly, and due to a vertical stratification characteristic of the medium of seawater, the sound velocity has a slow time-varying vertical distribution property. The vertical variation of an actual sound velocity profile (sound velocity gradient) is complicated, except that the sound velocity profile of superficial seawater that is fully stirred by wind and waves, or low temperature seawater in a polar region, presents a certain constant gradient. It is known from ray(wave) acoustics that a sound ray(wave) propagating in the ocean is curved, and the faster the sound velocity varies along a vertical depth, the more curved the sound ray(wave) is. The sound ray(wave) curvature means that a propagation distance of a sound signal from a transmitting point to a receiving point is greater than a linear distance between the transmitting point and the receiving point, and the degree of influence of the sound ray(wave) curvature varies at different positions in space.

When a requirement for the positioning accuracy of a positioning system is not high, or the underwater sound velocity distribution is relatively simple, an approximate function is commonly used to approximate the sound velocity profile or the shape of the sound ray(wave) to achieve fast underwater ranging and positioning. However, due to temporal and spatial variations, the actual sound velocity profile is complex, and the distribution of the sound velocity often cannot be accurately expressed by the function. The uneven distribution of the sound velocity in the vertical direction and the resulting sound ray(wave) curvature have a great influence on the ranging accuracy and positioning accuracy of the positioning system. Therefore, the sound ray(wave) curvature must be corrected. Calculating the distance of all locations in space based on an average sound velocity (constant sound velocity) is far from meeting the need for high-accuracy positioning. To this end, a sound ray(wave) tracking technology is widely used in the field of underwater acoustic ranging and underwater acoustic positioning. The sound ray(wave) tracking technology compensates the sound ray(wave) curvature by layered approximation and layer-by-layer calculation, so as to achieve the purpose of improving the positioning accuracy of the underwater acoustic positioning system. However, the sound ray(wave) tracking technology needs to balance the positioning accuracy and the amount of calculation, which brings a great constraint to a practical application.

SUMMARY

An objective of the present invention is to provide a method and system for determining a horizontal distance between a transmitting point and a receiving point, which can quickly and efficiently calculate the horizontal distance between the transmitting point and the receiving point.

To achieve the above objective, the present invention provides the following solution.

A method for determining a horizontal distance between a transmitting point and a receiving point, the method being applied to a device for determining the horizontal distance between the transmitting point and the receiving point, where the device includes the transmitting point, the receiving point, and an underwater moving carrier; the transmitting point is mounted on a sea surface fixed platform, and the receiving point is mounted on the underwater moving carrier; the transmitting point is stationary, and the receiving point is capable of following the underwater moving carrier to move; the underwater mobile carrier is capable of measuring a depth and a sound velocity in real time; and the method includes:

obtaining a depth value of the transmitting point and a depth value of the receiving point;

determining an area of a sound velocity profile according to the depth value of the transmitting point and the depth value of the receiving point;

determining a sound velocity gradient according to the area of the sound velocity profile; and determining the horizontal distance between the transmitting point and the receiving point according to the sound velocity gradient.

Optionally, the determining an area of a sound velocity profile according to the depth value of the transmitting point and the depth value of the receiving point specifically includes:

determining the area $S_a$ of the sound velocity profile according to the formula $S_a = \int_{z_0}^{z_B} c(z) \, dz$;

where, $S_a$ is the area of the sound velocity profile, $z_0$ is the depth of the transmitting point, $z_B$ is the depth of the receiving point, and $c(z)$ is a sound velocity profile between the depth of the transmitting point and the depth of the receiving point; and converting $S_a = \int_{z_0}^{z_B} c(z) \, dz$ into $S_{a,k} = \int_{z_0}^{z_{B,k}} c(z) \, dz$, where $S_{a,k}$ is the area of the sound velocity profile at the time of k, and calculating the area of the sound velocity profile at the time of k+1 by the following formula:

$$S_{a,k+1} = \int_{z_0}^{z_{B,k+1}} c(z)dz = \int_{z_0}^{z_{B,k}+\Delta z_k} c(z)dz =$$

$$\int_0^{z_{B,k}} c(z)dz + \int_{z_{B,k}}^{z_{B,k}+\Delta z_k} c(z)dz = S_{a,k} + \int_{z_{B,k}}^{z_{B,k}+\Delta z_k} c(z)dz = S_{a,k} + \Delta S_{k+1}$$

thereby obtaining the area of the sound velocity profile at the time of k+1;

where $\Delta z_k$ is a variation of the depth of the receiving point from the time of k to the time of k+1, and $\Delta S_{k+1}$ is a variation of the area from the time of k to the time of k+1.

Optionally, the determining a sound velocity gradient according to the area of the sound velocity profile specifically includes:

determining the sound velocity gradient g according to the area of the sound velocity profile by the formula $$g = \frac{2}{(z_B z_0)^2} S_a - \frac{2c_0}{z_B - z_0};$$

where, g is the sound velocity gradient, $z_0$ is the depth of the transmitting point, $z_B$ is the depth of the receiving point, $c_0$ is a sound velocity at $z_0$, and $S_a$ is the area of the sound velocity profile.

Optionally, the determining the horizontal distance between the transmitting point and the receiving point according to the sound velocity gradient specifically includes:

determining the horizontal distance χ between the transmitting point and the receiving point according to the formula $$\chi = \frac{1}{g}\sqrt{\frac{(c_0 e^{tg} - c)(c_0 - c e^{tg})}{e^{tg}}};$$

where, g is the sound velocity gradient, $c_0$ is a sound velocity at the depth of the transmitting point, c is a sound velocity at the depth of the receiving point, and t is a propagation time from the transmitting point to the receiving point.

A system for determining a horizontal distance between a transmitting point and a receiving point, including:

an obtaining module, for obtaining a depth value of the transmitting point and a depth value of the receiving point;

a sound velocity profile area determining module, for determining an area of a sound velocity profile according to the depth value of the transmitting point and the depth value of the receiving point;

a sound velocity gradient determining module, for determining a sound velocity gradient according to the area of the sound velocity profile; and a horizontal distance determining module, for determining the horizontal distance between the transmitting point and the receiving point according to the sound velocity gradient.

Optionally, the sound velocity profile area determining module specifically includes:

a sound velocity profile area determining unit, for determining the area $S_a$ of the sound velocity profile according to the formula $S_a = \int_{z_0}^{z_B} c(z)\,dz$;

where, $S_a$ is the area of the sound velocity profile, $z_0$ is the depth of the transmitting point, $z_B$ is the depth of the receiving point, and c(z) is a difference value between a sound velocity at the depth of the transmitting point and a sound velocity at the depth of the receiving point; and converting $S_a = \int_{z_0}^{z_B} c(z)\,dz$ into $S_{a,k} = \int_{z_0}^{z_{B,k}} c(z)\,dz$, where $S_{a,k}$ is the area of the sound velocity profile at the time of k, and calculating the area of the sound velocity profile at the time of k+1 by the following formula:

$$S_{a,k+1} = \int_{z_0}^{z_{B,k+1}} c(z)\,dz = \int_{z_0}^{z_{B,k}+\Delta z_k} c(z)\,dz =$$

-continued $$\int_0^{z_{B,k}} c(z)\,dz + \int_{z_{B,k}}^{z_{B,k}+\Delta z_k} c(z)\,dz = S_{a,k} + \int_{z_{B,k}}^{z_{B,k}+\Delta z_k} c(z)\,dz = S_{a,k} + \Delta S_{k+1}$$

thereby obtaining the area of the sound velocity profile at the time of k+1;

where $\Delta z_k$ is a variation of the depth of the receiving point from the time of k to the time of k+1, and $\Delta S_{k+1}$ is a variation of the area from the time of k to the time of k+1.

Optionally, the sound velocity gradient determining module specifically includes:

a sound velocity gradient determining unit, for determining the sound velocity gradient g according to the area of the sound velocity profile by the formula $$g = \frac{2}{(z_B - z_0)^2} S_a - \frac{2c_0}{z_B - z_0};$$

where, g is the sound velocity gradient, $z_0$ is the depth of the transmitting point, $z_B$ is the depth of the receiving point, $c_0$ is a sound velocity at $z_0$, and $S_a$ is the area of the sound velocity profile.

Optionally, the horizontal distance determining module specifically includes:

a horizontal distance determining unit, for determining the horizontal distance χ between the transmitting point and the receiving point according to the formula $$\chi = \frac{1}{g}\sqrt{\frac{(c_0 e^{tg} - c)(c_0 - c e^{tg})}{e^{tg}}};$$

where, g is the sound velocity gradient, $c_0$ is a sound velocity at the depth of the transmitting point, c is a sound velocity at the depth of the receiving point, and t is a propagation time from the transmitting point to the receiving point.

According to specific embodiments provided in the present invention, the present invention discloses the following technical effects: the present invention provides a method for determining a horizontal distance between a transmitting point and a receiving point, including obtaining a depth value of the transmitting point and a depth value of the receiving point; determining an area of a sound velocity profile according to the depth value of the transmitting point and the depth value of the receiving point; determining a sound velocity gradient according to the area of the sound velocity profile; and determining the horizontal distance between the transmitting point and the receiving point according to the sound velocity gradient. The present invention no longer needs to calculate a grazing angle of an eigen sound ray connecting the transmitting point and the receiving point, but directly convert a propagation time into the horizontal distance, thereby quickly and efficiently calculating the horizontal distance between the transmitting point and the receiving point.

BRIEF DESCRIPTION OF THE DRAWINGS

To describe the technical solutions in the embodiments of the present invention or in the prior art more clearly, the following briefly describes the accompanying drawings required for describing the embodiments. The accompanying drawings in the following description show some embodiments of the present invention, and a person of ordinary skill in the art may still derive other drawings from these accompanying drawings without creative efforts.

DETAILED DESCRIPTION

Figure 1:
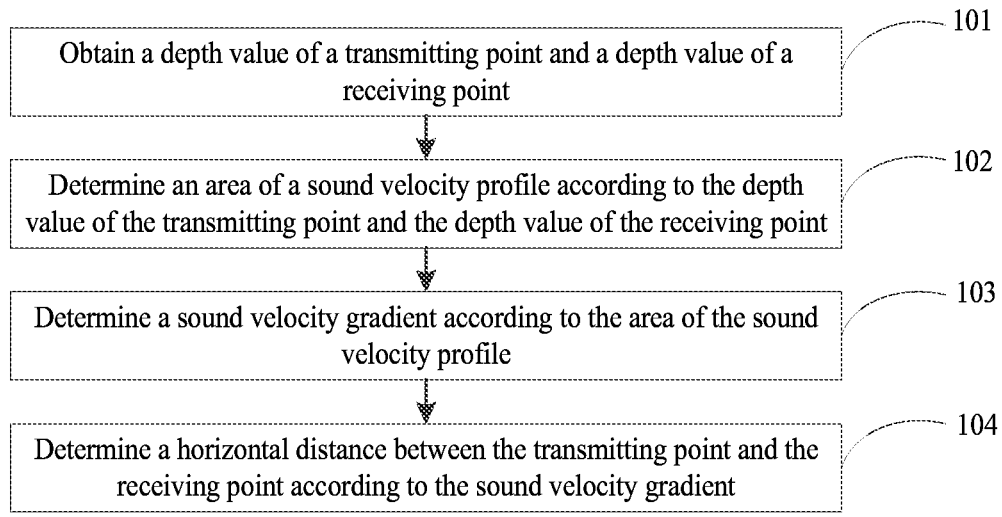
FIG. 1 is a flowchart of a method for determining a horizontal distance between a transmitting point and a receiving point according to an embodiment of the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a method and system for determining a horizontal distance between a transmitting point and a receiving point, which can quickly and efficiently calculate the horizontal distance between the transmitting point and the receiving point.

To make the foregoing objective, features, and advantages of the present invention clearer and more comprehensible, the present invention is further described in detail below with reference to the accompanying drawings and specific embodiments.

An ultra-short baseline positioning system and a long baseline positioning system are the two most commonly used underwater positioning systems. The ultra-short baseline positioning system has two main observed quantities, namely a propagation time and an angle of incidence (azimuth and elevation), where the propagation time is converted by a sound velocity into a slant range between a transmitting point and a receiving point. In a three-dimensional space, the position of the transmitting point relative to the receiving point can be uniquely determined by the slant range, the azimuth angle, and the elevation. The long baseline positioning system has a main observed quantity that is a propagation time between a transponder (more than 3 at known locations) and a long baseline receiver, where the propagation time is converted to a corresponding slant range by a sound velocity. In a three-dimensional space, if the slant range between the long baseline receiver and more than three transponders is known, the position of the long baseline receiver can be uniquely determined. It can be seen that in the ultra-short baseline positioning system and the long baseline positioning system, the propagation time from the transmitting point to the receiving point needs to be converted into the slant range between the transmitting point and the receiving point.

In a practical application, the propagation time of a sound wave from the transmitting point to the receiving point is easily measured and the measurement accuracy is high. The depths of the transmitting and receiving points are easily measured by a high-accuracy pressure sensor. A depth, a horizontal distance and the slant range between the transmitting point and the receiving point satisfy a triangular geometric relationship, so that the horizontal distance and the slant range can be converted to each other. Therefore, the main difficulty facing underwater acoustic positioning is how to convert the measured high-accuracy propagation time into the horizontal distance or slant range.

Figure 3:
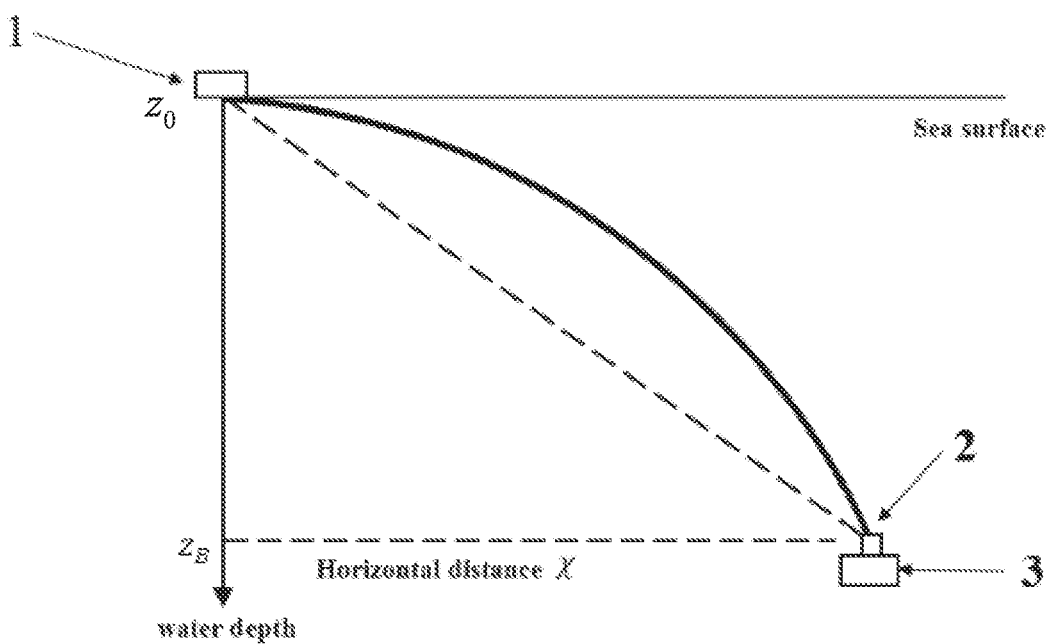
FIG. 3 is a schematic diagram of a device for determining a horizontal distance between a transmitting point and a receiving point according to an embodiment of the present invention.

FIG. 1 is a flowchart of a method for determining a horizontal distance between a transmitting point and a receiving point according to an embodiment of the present invention. As shown in FIG. 1, the method for determining a horizontal distance between a transmitting point and a receiving point, utilizes a device for determining the horizontal distance between the transmitting point and the receiving point, where as shown in FIG. 3, the device includes the transmitting point 1, the receiving point 2, and an underwater moving carrier 3. The transmitting point 1 is mounted on a sea surface fixed platform, and the receiving point 2 is mounted on the underwater moving carrier 3. The transmitting point 1 is stationary, and the receiving point 2 is capable of following the underwater moving carrier 3 to move, and the underwater mobile carrier 3 is capable of measuring a depth and a sound velocity in real time. The method includes:

step 101: obtaining a depth value of the transmitting point and a depth value of the receiving point;

step 102: determining an area of a sound velocity profile according to the depth value of the transmitting point and the depth value of the receiving point;

step 103: determining a sound velocity gradient according to the area of the sound velocity profile; and step 104: determining the horizontal distance between the transmitting point and the receiving point according to the sound velocity gradient.

The step 102 specifically includes determining the area $S_a$ of the sound velocity profile according to the formula $S_a = \int_{z_0}^{z_B} c(z) \, dz$;

where, $S_a$ is the area of the sound velocity profile, $z_0$ is the depth of the transmitting point, $z_B$ is the depth of the receiving point, and $c(z)$ is a sound velocity profile between the depth of the transmitting point and the depth of the receiving point.

When the depth of the receiving point varies, the corresponding sound velocity gradient g and $S_a$ need to be recalculated. If a real sound velocity profile has dense sampling points, the amount of calculation is large in the case of deep sea. Therefore, in step 102, when the area of the sound velocity profile is calculated, $S_a = \int_{z_0}^{z_B} c(z) \, dz$ can be converted into $S_{a,k} = \int_{z_0}^{z_{B,k}} c(z) \, dz$, where $S_{a,k}$ is the area of the sound velocity profile at the time of k, so that the area of the sound velocity profile at the time of k+1 can be directly calculated by the following formula:

$$S_{a,k+1} = \int_{z_0}^{z_{B,k+1}} c(z)dz = \int_{z_0}^{z_{B,k}+\Delta z_k} c(z)dz =$$

$$\int_0^{z_{B,k}} c(z)dz + \int_{z_{B,k}}^{z_{B,k}+\Delta z_k} c(z)dz = S_{a,k} + \int_{z_{B,k}}^{z_{B,k}+\Delta z_k} c(z)dz = S_{a,k} + \Delta S_{k+1}$$

thereby obtaining the area of the sound velocity profile at the time of k+1;

where $\Delta z_k$ is a variation of the depth of the receiving point from the time of k to the time of k+1, and $\Delta S_{k+1}$ is a variation of the area from the time of k to the time of k+1.

It can be seen that each time when $S_{a,k+1}$ is calculated, it is not necessary to integrate all depths, but only to calculate the variation of the area from the time of k to the time of k+1, which can greatly reduce the amount of calculation.

It can be seen, that considering the case of an actual sound velocity profile is complicated and is not a constant-gradient sound velocity profile. A constant-gradient sound velocity profile fast calculation method is proposed based on a constant-gradient sound velocity profile method. In the deep sea, especially when the actual sound velocity profile has dense sampling points, if the depth of the transmitting point or the depth of the receiving point varies, an integral needs to be recalculated, and the amount of calculation required is large. Through the proposed fast calculation method, it is only necessary to calculate an integral corresponding to a varying part, rather than all of the depth of the transmitting point or the depth of the receiving point, which greatly improves the calculation efficiency.

The step 103 specifically includes:

determining the sound velocity gradient g according to the area of the sound velocity profile by the formula $$g = \frac{2}{(z_B - z_0)^2} S_a - \frac{2c_0}{z_B - z_0};$$

where, g is the sound velocity gradient, $z_0$ is the depth of the transmitting point, $z_B$ is the depth of the receiving point, $c_0$ is a sound velocity at $z_0$, and $S_a$ is the area of the sound velocity profile.

The step 104 specifically includes:

determining the horizontal distance $\chi$ between the transmitting point and the receiving point according to the formula $$\chi = \frac{1}{g}\sqrt{\frac{(c_0 e^{tg} - c)(c_0 - c e^{tg})}{e^{tg}}};$$

where, g is the sound velocity gradient, $c_0$ is a sound velocity at the depth of the transmitting point, c is a sound velocity at the depth of the receiving point, and t is a propagation time from the transmitting point to the receiving point.

The present invention has the following beneficial effects.

(1) First, the formulas of the constant-gradient sound velocity profile, the propagation time and the horizontal distance are derived; thus, it is no longer necessary to calculate a grazing angle of an eigen sound ray(wave) connecting the transmitting point and the receiving point, but directly convert the propagation time into the horizontal distance.

(2) Considering the case that an actual sound velocity profile is complicated and is not a constant-gradient sound velocity profile, a constant-gradient sound velocity profile fast calculation method is proposed based on a constant-gradient sound velocity profile method. In the deep sea, especially when the actual sound velocity profile has dense sampling points, if the depth of the transmitting point or the depth of the receiving point varies, an integral needs to be recalculated, and the amount of calculation required is large. The present invention only needs to calculate an integral corresponding to a varying part rather than all of the depth of the transmitting point or the depth of the receiving point, which greatly improves the calculation efficiency.

A seawater medium has the characteristic of vertical stratification, i.e. the sound velocity c (refractive index n) does not vary along the horizontal direction, but is a function of the depth of the seawater. If x,y represents horizontal coordinates and z represents a vertical coordinate, then in the layered medium $$c(x, y, z) = c(z) \quad (1)$$

$$n(x, y, z) = n(z) \quad (2)$$

in addition to an ultra-long-range acoustic propagation problem, a layered model of the seawater medium is an approximate ideal model for the actual ocean medium.

Further, when a variation gradient of a sound velocity profile is constant, a corresponding sound velocity profile is $$c = c_0 + gz \quad (3)$$

where, $c_0$ is a sound velocity at $z_0$, and g is a constant sound velocity gradient.

For the constant-gradient sound velocity profile, a sound ray trace is an arc, and corresponding propagation time t and horizontal distance $\chi$ are respectively $$t = \frac{1}{g}\ln\left[\frac{\tan\left(\frac{\theta}{2} + \frac{\pi}{4}\right)}{\tan\left(\frac{\theta_0}{2} + \frac{\pi}{4}\right)}\right] \quad (4)$$

$$\chi = \frac{c_0}{g\cos\theta_0}|\sin\theta_0 - \sin\theta| \quad (5)$$

where, $z_0$ is a depth of a transmitting point, and $\theta_0$ is a corresponding grazing angle; z is a depth of a receiving point, and $\theta$ is a corresponding grazing angle.

Usually, in a practical application, the depth of the transmitting point, the depth of the receiving point, the speed velocity profile and the propagation time t can be directly measured. It can be seen from the formulas (4) and (5) that the propagation time t of a sound ray(wave) and the horizontal distance $\chi$ are functions of an initial grazing angle and a receiving grazing angle. It is not possible to convert the propagation time t directly to the horizontal distance $\chi$. To calculate the horizontal distance $\chi$, it is necessary to calculate $\sin\theta_0$, $\cos\theta_0$ and $\sin\theta$ separately.

To calculate $\sin\theta_0$:

convert the formula (4) to $$e^{tg} = \frac{\tan\left(\frac{\theta}{2} + \frac{\pi}{4}\right)}{\tan\left(\frac{\theta_0}{2} + \frac{\pi}{4}\right)} \quad (6)$$

let $\mu = e^{tg}$ \quad (7)

then $\mu = \dfrac{1+\sin\theta}{\cos\theta} \cdot \dfrac{\cos\theta_0}{1+\sin\theta_0} = \dfrac{\cos\theta_0 + \cos\theta_0\sin\theta}{\cos\theta + \cos\theta\sin\theta_0}$ \quad (8)

by a simple mathematical operation, obtain $\mu \cos\theta + \mu \sin\theta_0 \cos\theta - \sin\theta \cos\theta_0 = \cos\theta_0$ \quad (9)

according to a Snell law $$\frac{\cos\theta_0}{c_0} = \frac{\cos\theta}{c} \quad (10)$$

refractive index n $$n = \frac{c_0}{c} \tag{11}$$

according to the formulas (10) and (11), obtain $$\cos\theta = \frac{1}{n}\cos\theta_0 \tag{12a}$$

$$\cos\theta_0 = n\cos\theta \tag{12b}$$

substitute the formula (12a) into the formula (9), and obtain $$\mu\frac{1}{n}\cos\theta_0 + \mu\sin\theta_0\frac{1}{n}\cos\theta_0 - \sin\theta\cos\theta_0 = \cos\theta_0 \tag{13}$$

eliminate $\cos\theta_0$ on both sides of the formula (13) to separate out $\sin\theta$, and obtain $$\sin\theta = \frac{\mu}{n} - 1 + \frac{\mu}{n}\sin\theta_0 \tag{14}$$

square the two sides of the formulas (14) and (12a), and obtain $$\sin^2\theta = \frac{(\mu-n)^2}{n^2} + 2\frac{\mu-n}{n}\cdot\frac{\mu}{n}\sin\theta_0 + \frac{\mu^2}{n^2}\sin^2\theta_0 \tag{15}$$

$$\cos^2\theta = \frac{1}{n^2}\cos^2\theta_0 = \frac{1}{n^2} - \frac{1}{n^2}\sin^2\theta_0 \tag{16}$$

a trigonometric function squared relationship:

$$\sin^2\theta + \cos^2\theta = 1 \tag{17}$$

according to the formulas (15), (16) and (17), obtain $$1 = \frac{(\mu-n)^2}{n^2} + \frac{2(\mu-n)^b}{n^2}\sin\theta_0 + \frac{\mu^2}{n^2}\sin^2\theta_0 + \frac{1}{n^2} - \frac{1}{n^2}\sin^2\theta_0 \tag{18}$$

by a simple mathematical operation, obtain $$(\mu^2-1)\sin^2\theta_0 + 2(\mu-n)\mu\sin\theta_0 + \mu^2 - 2n\mu + 1 = 0 \tag{19}$$

where the formula (19) is a quadratic equation of $\sin\theta_0$, and based on a root extraction formula of the quadratic equation, obtain $$\sin\theta_0 = \frac{-2(\mu-n)\mu \pm \sqrt{4(\mu-n)^2\mu^2 - 4(\mu^2-1)(\mu^2-2n\mu+1)}}{2(\mu^2-1)} \tag{20}$$

$$= \frac{(n\mu-\mu^2) \pm (n\mu-1)}{\mu^2-1}$$

$$= \begin{cases} +: \dfrac{2n\mu-\mu^2-1}{\mu^2-1} \\ -: -1 \end{cases}$$

$\theta_0$ is an initial grazing angle, so that $$\sin\theta_0 \neq -1 \tag{21}$$

then $$\sin\theta_0 = \frac{2n\mu-\mu^2-1}{\mu^2-1} \tag{22}$$

to calculate $\cos\theta_0$:
substitute the formula (22) into the formula (17), and by a simple mathematical operation, obtain $$\cos\theta_0 = \sqrt{1-\sin^2\theta_0} = \tag{23}$$

$$\sqrt{\frac{(\mu^2-1)^2 - (2n\mu-\mu^2-1)^2}{(\mu^2-1)^2}} = \frac{2}{|\mu^2-1|}\sqrt{(\mu-n)(n\mu-1)\mu}$$

to calculate $\sin\theta$:
substitute the formula (12b) into the formula (9), and obtain $$\mu\cos\theta + \mu\sin\theta_0\cos\theta - n\cos\theta\sin\theta = n\cos\theta \tag{24}$$

eliminate $\cos\theta$ on both sides of the formula (24) to separate out $\sin\theta_0$, and obtain $$\sin\theta_0 = \frac{n-\mu}{\mu} + \frac{n}{\mu}\sin\theta \tag{25}$$

square the two sides of the formulas (25) and (12b), and obtain $$\sin^2\theta_0 = \frac{(n-\mu)^2}{\mu^2} + 2\frac{n-\mu}{\mu}\cdot\frac{n}{\mu}\sin\theta + \frac{n^2}{\mu^2}\sin^2\theta \tag{26}$$

$$\cos^2\theta_0 = n^2\cos^2\theta = n^2 - n^2\sin^2\theta \tag{27}$$

according to the formulas (17), (26) and (27), obtain $$1 = \frac{(n-\mu)^2}{\mu^2} + 2\frac{n-\mu}{\mu}\cdot\frac{n}{\mu}\sin\theta + \frac{n^2}{\mu^2}\sin^2\theta + n^2 - n^2\sin^2\theta \tag{28}$$

by a simple mathematical operation, obtain $$(n-n\mu^2)\sin^2\theta + 2(n-\mu)\sin\theta + n\mu^2 + n - 2\mu = 0 \tag{29}$$

where the formula (29) is a quadratic equation of $\sin\theta$, and based on a root extraction formula of the quadratic equation, obtain:

$$\sin\theta = \frac{-2(n-\mu) \pm \sqrt{4(n-\mu)^2 - 4(n-n\mu^2)(n\mu^2+n-2\mu)}}{2(n-n\mu^2)} \tag{30}$$

$$= \frac{-(n-\mu) \pm \sqrt{\mu^2(n\mu-1)^2}}{n(1-\mu^2)}$$

$$= \begin{cases} +: -1 \\ -: \dfrac{2\mu-n-n\mu^2}{n(1-\mu^2)} \end{cases}$$

θ is an angle of emergence, so that $$\sin\theta \neq -1 \quad (31)$$

then $$\sin\theta = \frac{2\mu - n - n\mu^2}{n(1-\mu^2)} \quad (32)$$

to calculate the horizontal distance $\chi$:

respectively substitute the formula (22), (23) and (32) into the formula (6), and by a series of operations, obtain $$\chi = \frac{c_0|\mu^2-1|}{2g\sqrt{(\mu-n)(n\mu-1)\mu}}\left|\frac{2n\mu-\mu^2-1}{\mu^2-1} - \frac{2\mu-n-n\mu^2}{n(1-\mu^2)}\right| = \frac{c_0}{g} \cdot \frac{1}{n}\sqrt{\frac{(n\mu-1)(n-\mu)}{\mu}} \quad (33)$$

substitute the formulas (7) and (11) into (33), and obtain $$\chi = \frac{1}{g}\sqrt{\frac{(c_0 e^{tg}-c)(c_0 - c e^{tg})}{e^{tg}}} \quad (34)$$

It can be seen from the formula (34) that under a constant-gradient sound velocity profile, if a sound velocity $c_0$ at a depth of a transmitting point, a sound velocity c at a depth of a receiving point, a speed velocity gradient g and a propagation time from the transmitting point to the receiving point are known, a horizontal distance $\chi$ between the transmitting point and the receiving point can be obtained directly without the need to calculate an initial grazing angle of a sound ray.

A horizontal distance obtained by positioning of different sound velocity profiles is only related to an area enclosed by respective sound velocity profile and a depth coordinate axis as well as the initial grazing angle, and is independent of the specific distribution form of the sound velocity profile. Therefore, a sound velocity profile curve with constant-gradient sound velocity distribution can be used instead of a real sound velocity profile.

An area $S_a$ enclosed by a real sound velocity profile and a depth coordinate axis is $$S_a = \int_{z_0}^{z_B} c(z) dz \quad (35)$$

An area $S_e$ enclosed by a constant-gradient sound velocity profile and a depth coordinate axis under the same surface sound velocity is $$S_e = \frac{c_0 + c_B}{2}(z_B - z_0) \quad (36)$$

Let $S_a = S_e$, then $$c_B = \frac{1}{z_B - z_0}\int_{z_0}^{z_B} c(z) dz - c_0 \quad (37)$$

The constant-gradient sound velocity profile satisfies the following form $$c_B = c_0 + g(z_B - z_0) \quad (38)$$

where $c_0$ is a sound velocity at $z_0$, and g is a constant sound velocity gradient; the formula (37) is substituted into (38) to obtain $$g = \frac{2}{(z_B - z_0)^2} S_a - \frac{2c_0}{z_B - z_0} \quad (39)$$

Thus, when the real sound velocity profile between a depth $z_0$ and a depth $z_B$ is known, an equivalent sound velocity profile can be uniquely determined.

It is assumed that the depth of the transmitting point is $z_0$, and the depth of the receiving point is $z_B$. Only the case that the position of the receiving point can be moved when the transmitting point is stationary at the sea surface is considered; other cases can be obtained by a simple deduction. When the depth of the receiving point varies, the corresponding sound velocity gradient g and $S_a$ need to be recalculated. If the real sound velocity profile has dense sampling points, the amount of calculation is large in the case of deep sea. However, in the present invention, each time when $S_{a,k+1}$ is calculated, it is not necessary to integrate all depths, but only to calculate the variation of the area from the time of k to the time of k+1, which can greatly reduce the amount of calculation.

Figure 2:
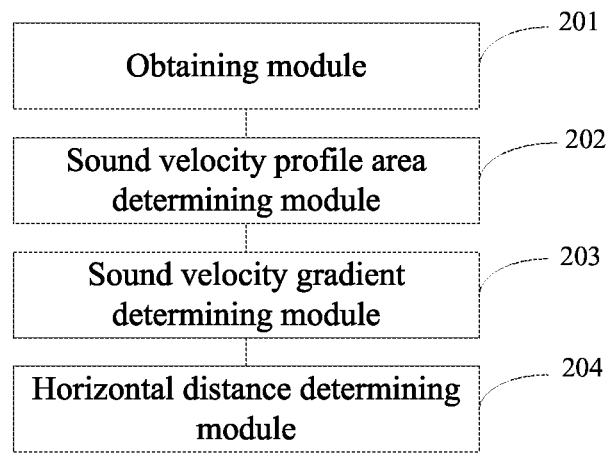
FIG. 2 is a structural block diagram of a system for determining a horizontal distance between a transmitting point and a receiving point according to an embodiment of the present invention.

FIG. 2 is a system for determining a horizontal distance between a transmitting point and a receiving point according to an embodiment of the present invention. As shown in FIG. 2, a system for determining a horizontal distance between a transmitting point and a receiving point, including:

an obtaining module 201, for obtaining a depth value of the transmitting point and a depth value of the receiving point;

a sound velocity profile area determining module 202, for determining an area of a sound velocity profile according to the depth value of the transmitting point and the depth value of the receiving point;

a sound velocity gradient determining module 203, for determining a sound velocity gradient according to the area of the sound velocity profile; and a horizontal distance determining module 204, for determining the horizontal distance between the transmitting point and the receiving point according to the sound velocity gradient.

The sound velocity profile area determining module 202 specifically includes:

a sound velocity profile area determining unit, for determining the area $S_a$ of the sound velocity profile according to the formula $S_a = \int_{z_0}^{z_B} c(z) dz$;

where, $S_a$ is the area of the sound velocity profile, $z_0$ is the depth of the transmitting point, $z_B$ is the depth of the receiving point, and c(z) is a sound velocity profile between the depth of the transmitting point and the depth of the receiving point; and converting $S_a = \int_{z_0}^{z_B} c(z) dz$ into $S_{a,k} = \int_{z_0}^{z_{B,k}} c(z) dz$, where $S_{a,k}$ is the area of the sound velocity profile at the time of k, and calculating the area of the sound velocity profile at the time of k+1 by the following formula:

$$S_{a,k+1} = \int_{z_0}^{z_{B,k+1}} c(z) dz = \int_{z_0}^{z_{B,k}+\Delta z_k} c(z) dz = \int_0^{z_{B,k}} c(z) dz + \int_{z_{B,k}}^{z_{B,k}+\Delta z_k} c(z) dz = S_{a,k} + \int_{z_{B,k}}^{z_{B,k}+\Delta z_k} c(z) dz = S_{a,k} + \Delta S_{k+1}$$

thereby obtaining the area of the sound velocity profile at the time of k+1;

where, $\Delta z_k$ is a variation of the depth of the receiving point from the time of k to the time of k+1, and $\Delta S_{k+1}$ is a variation of the area from the time of k to the time of k+1.

The sound velocity gradient determining module 203 specifically includes:

a sound velocity gradient determining unit, for $$g = \frac{2}{(z_B - z_0)^2} S_a - \frac{2c_0}{z_B - z_0}$$

determining the sound velocity gradient g according to the area of the sound velocity profile by the formula;

where, g is the sound velocity gradient, $z_0$ is the depth of the transmitting point, $z_B$ is the depth of the receiving point, $c_0$ is a sound velocity at $z_0$, and $S_a$ is the area of the sound velocity profile.

The horizontal distance determining module 204 includes a horizontal distance determining unit, for determining the horizontal distance $\chi$ between the transmitting point and the receiving point according to the formula $$\chi = \frac{1}{g} \sqrt{\frac{(c_0 e^{tg} - c)(c_0 - c e^{tg})}{e^{tg}}}$$

where, g is the sound velocity gradient, $c_0$ is a sound velocity at the depth of the transmitting point, c is a sound velocity at the depth of the receiving point, and t is a propagation time from the transmitting point to the receiving point.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A method for determining a horizontal distance between a transmitting point and a receiving point, the method comprising:

measuring a depth value of the transmitting point by a first pressure sensor arranged on the transmitting point and a depth value of the receiving point by a second pressure sensor arranged on an underwater mobile carrier, wherein the transmitting point is mounted on a sea surface fixed platform, and the receiving point is mounted on the underwater mobile carrier, the transmitting point is stationary, and the receiving point is capable of following the underwater mobile carrier to move;

determining an area of a sound velocity profile based on the depth value of the transmitting point and the depth value of the receiving point according to a formula:

$$S_a = \int_{z_0}^{z_B} c(z) dz,$$

wherein $S_a$ is the area of the sound velocity profile, $z_0$ is the depth of the transmitting point, $z_B$ is the depth of the receiving point, and c(z) is a sound velocity profile between the depth of the transmitting point and the depth of the receiving point;

determining a sound velocity gradient based on the area of the sound velocity profile according to a formula:

$$g = \frac{2}{(z_B - z_0)^2} S_a - \frac{2c_0}{z_B - z_0},$$

wherein, g is the sound velocity gradient, $z_0$ is the depth of the transmitting point, $z_B$ is the depth of the receiving point, $c_0$ is a sound velocity at $z_0$, and $S_a$ is the area of the sound velocity profile; and determining the horizontal distance between the transmitting point and the receiving point based on the sound velocity gradient according to a formula:

$$\chi = \frac{1}{g} \sqrt{\frac{(c_0 e^{tg} - c)(c_0 - c e^{tg})}{e^{tg}}},$$

wherein, X is the horizontal distance, g is the sound velocity gradient, $c_0$ is a sound velocity at the depth of the transmitting point, c is a sound velocity at the depth of the receiving point measured by the underwater mobile carrier, and t is a propagation time from the transmitting point to the receiving point.

2. The method for determining a horizontal distance between a transmitting point and a receiving point according to claim 1, wherein the determining an area of a sound velocity profile according to the depth value of the transmitting point and the depth value of the receiving point further comprises:

converting $S_a = \int_{z_0}^{z_B} c(z) dz$ into $S_{a,k} = \int_{z_0}^{z_{B,k}} c(z) dz$, wherein $S_{a,k}$ is the area of the sound velocity profile at the time of k, and calculating the area of the sound velocity profile at the time of k+1 by the following formula:

$$S_{a,k+1} = \int_{z_0}^{z_{B,k+1}} c(z) dz = \int_{z_0}^{z_{B,k}+\Delta z_k} c(z) dz =$$

$$\int_0^{z_{B,k}} c(z) dz + \int_{z_{B,k}}^{z_{B,k}+\Delta z_k} c(z) dz = S_{a,k} + \int_{z_{B,k}}^{z_{B,k}+\Delta z_k} c(z) dz = S_{a,k} + \Delta S_{k+1}$$

thereby obtaining the area of the sound velocity profile at the time of k+1;

wherein $\Delta z_k$ is a variation of the depth of the receiving point from the time of k to the time of k+1, and $\Delta S_{k+1}$ is a variation of the area from the time of k to the time of k+1.

3. A system for determining a horizontal distance between a transmitting point and a receiving point, comprising:

an underwater mobile carrier having a second pressure sensor mounted therein;

the transmitting point mounted on a sea surface fixed platform and being stationary and having a first pressure sensor mounted therein;

the receiving point mounted on the underwater mobile carrier, and being capable of following the underwater mobile carrier to move:

a memory storing program codes; and a processor performing the stored program codes for:

obtaining a depth value of the transmitting point measured by a first pressure sensor and a depth value of the receiving point measured by a second pressure sensor;

determining an area of a sound velocity profile based on the depth value of the transmitting point and the depth value of the receiving point according to a formula:

$$S_a = \int_{z_0}^{z_B} c(z) dz,$$

wherein $S_a$ is the area of the sound velocity profile, $z_0$ is the depth of the transmitting point, $z_B$ is the depth of the receiving point, and c(z) is a sound velocity profile between the depth of the transmitting point and the depth of the receiving point;

determining a sound velocity gradient based on the area of the sound velocity profile according to a formula:

$$g = \frac{2}{(z_B - z_0)^2} S_a - \frac{2c_0}{z_B - z_0},$$

wherein, g is the sound velocity gradient, $z_0$ is the depth of the transmitting point, $z_B$ is the depth of the receiving point, $c_0$ is a sound velocity at $z_0$, and $S_a$ is the area of the sound velocity profile; and determining the horizontal distance between the transmitting point and the receiving point based on the sound velocity gradient according to a formula:

$$\chi = \frac{1}{g} \sqrt{\frac{(c_0 e^{tg} - c)(c_0 - c e^{tg})}{e^{tg}}},$$

wherein, X is the horizontal distance, g is the sound velocity gradient, $c_0$ is a sound velocity at the depth of the transmitting point, c is a sound velocity at the depth of the receiving point measured by the underwater mobile carrier, and t is a propagation time from the transmitting point to the receiving point.

4. The system for determining a horizontal distance between a transmitting point and a receiving point according to claim 3, wherein the sound velocity profile area determining module further comprises:

converting $S_a = \int_{z_0}^{z_B} c(z) dz$ into $S_{a,k} = \int_{z_0}^{z_{B,k}} c(z) dz$, wherein $S_{a,k}$ is the area of the sound velocity profile at the time of k, and calculating the area of the sound velocity profile at the time of k+1 by the following formula:

$$S_{a,k+1} = \int_{z_0}^{z_{B,k+1}} c(z) dz = \int_{z_0}^{z_{B,k}+\Delta z_k} c(z) dz =$$

$$\int_0^{z_{B,k}} c(z) dz + \int_{z_{B,k}}^{z_{B,k}+\Delta z_k} c(z) dz = S_{a,k} + \int_{z_{B,k}}^{z_{B,k}+\Delta z_k} c(z) dz = S_{a,k} + \Delta S_{k+1}$$

thereby obtaining the area of the sound velocity profile at the time of k+1;

wherein $\Delta z_k$ is a variation of the depth of the receiving point from the time of k to the time of k+1, and $\Delta S_{k+1}$ is a variation of the area from the time of k to the time of k+1.

\* \* \* \* \*